United States Patent

Tani et al.

[11] Patent Number: 5,809,078
[45] Date of Patent: Sep. 15, 1998

[54] RELAY NODE SYSTEM AND RELAY CONTROL METHOD OF THE SAME SYSTEM

[75] Inventors: Hideaki Tani, Tokyo; Takao Ninomiya, Kawasaki, both of Japan

[73] Assignee: Digital Vision Laboratories Corporation, Tokyo, Japan

[21] Appl. No.: 855,095

[22] Filed: May 13, 1997

[30] Foreign Application Priority Data

Jan. 14, 1997 [JP] Japan .................................... 9-004720

[51] Int. Cl.$^6$ .................................................. H04L 27/00
[52] U.S. Cl. .......................... 375/259; 370/413; 370/428; 395/497.01; 395/497.02; 395/497.03; 365/194
[58] Field of Search .................................... 370/230, 235, 370/378, 379, 412, 428, 252, 313, 314; 395/427, 497.01, 497.02, 497.03; 364/246.5, 964.2; 365/189.01, 194; 375/211, 372, 259

[56] References Cited

U.S. PATENT DOCUMENTS

| | | |
|---|---|---|
| 4,792,926 | 12/1988 | Roberts . |
| 5,157,260 | 10/1992 | Hirie et al. ................................ 370/428 |
| 5,227,876 | 7/1993 | Cucchi et al. ........................... 370/428 |
| 5,375,212 | 12/1994 | Nishino et al. ......................... 370/473 |
| 5,500,874 | 3/1996 | Terrell ...................................... 375/232 |
| 5,521,920 | 5/1996 | Nagase ..................................... 370/376 |
| 5,579,507 | 11/1996 | Hosouchi et al. . |

*Primary Examiner*—Wellington Chin
*Assistant Examiner*—Congvan Tran
*Attorney, Agent, or Firm*—Christensen O'Connor Johnson & Kindness PLLC

[57] ABSTRACT

A relay node system, which receives a data stream having a series of data elements transmitted from a transmitting node and which re-outputs the data stream to a receiving node, comprises data receiving section for receiving the data stream transmitted from the transmitting node, storing section for temporarily storing data of the received data stream, and data transmitting section for reading the data stored in the storing section to be transmitted to the receiving node, wherein the storing section includes primary buffer section, having a high-speed memory, for temporarily storing data of the data stream, secondary buffer section having a memory capacity slower and larger than the primary buffer section, and data transfer section for executing a save processing and a restore processing, the save processing including processing for detecting danger of an overflow at an input side of the primary buffer section to transfer data from the primary buffer section to the secondary buffer section by a block unit, and the restore processing including processing transferring data saved to the secondary buffer section to the primary buffer section by a block unit for the data transmission by the data transmitting section.

20 Claims, 10 Drawing Sheets

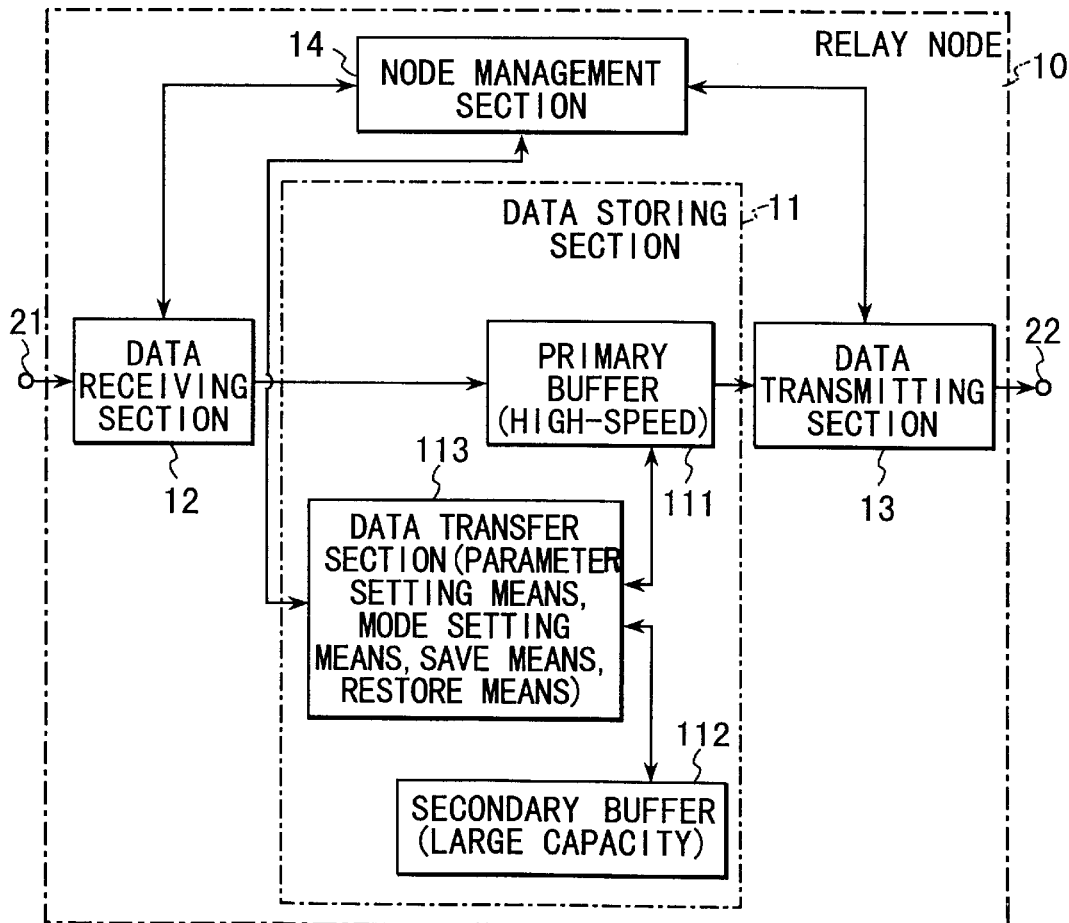
F I G. 2

RELAY NODE SYSTEM AND RELAY CONTROL METHOD OF THE SAME SYSTEM

BACKGROUND OF THE INVENTION

The present invention relates to a communication system for transmitting a data stream such as video data, which comprises a series of data elements, from a transmission node to a receiving node, and particularly to a relay node system for receiving the data stream from the transmission node to re-output data to the receiving node on a network and a relay control method of the same system.

(a1) Basic structure of the relay node

FIG. 1 shows a general relay node. The relay node receives a data stream, which comprises a series of data elements from a transmission node, to re-output data to a receiving node.

The relay node 10 of FIG. 1 comprises a data storing section 11, a data receiving section 12, a data transmitting section 13, and a node management section 14.

The data receiving section 12 receives a data packet (or a data frame), which is a series of data elements constituting the data stream, from a network through a communication interface 21. Then, the data receiving section 12 writes data included in the packet to the data storing section 11. The data transmitting section 13 reads data from the data storing section 11 to be assembled in the data packet of the corresponding data stream, and to be transmitted to the network through a communication interface 22. The node management section 14 manages the control of obtaining each state of the data storing section 11, the data receiving section 12, and the data transmitting section 13, and that of each of these sections.

In the communication system having the relay node 10 of FIG. 1, if the data stream, that is, the series of data packets are transmitted to the relay node 10 from the transmitting node, these packets are stored in the data storing section 11 by the data receiving section 12 of the relay node 10. On the other hand, these packets are read again by the data transmitting section 13 to be re-output to the relay node of a next stage or a receiving terminal.

(a2) Object of inserting the relay node

Generally, an object of inserting the relay node 10 between the receiving and transmitting nodes includes an internet connection, an address conversion, a data format conversion, a reconstruction of a packet transfer period, a select packet abandon based on a designated rule. Particularly, for relaying the data stream including real time data such as video data, the following point is required. Specifically, there is used a relay processing for receiving the large capacity of data from the transmission node, which is short of a stable stream rate control ability, and re-outputting data based on a high precise rate control. By use of such a relay processing, a large amount of jitters can be buffered.

(a3) Data storing system at relay node

Conventionally, either of the following two data storing systems is generally used in the data storing section 11 of the relay node 10 of FIG. 1.

One is a data storing system (first data storing system) for temporarily storing arrival data to a semiconductor buffer memory. The other is a data storing system (second data storing system) for temporarily storing arrival data to a secondary large capacity storage medium such as a magnetic disk.

The first data storing system has the following merits and demerits. Specifically, in the merits, a buffer management is executed at high speed and a delay time between an output and an input is short. In the demerits, since the large amount of jitters is buffered, the cost of enlarging the storage capacity is increased. On the other hand, the second data storing system is suitable for a large capacity storage. However, delay time, which is caused in accordance with storing medium writing/reading, and its variation are large.

It is needed that the relay node for relaying the data stream buffers the large amount of jitters. To accomplish such requirement, there are needed both the enlargement of the storage capacity of the relay data and a relay operation with short delay time.

However, in the first data storing system, it was difficult to enlarge the storage capacity in view of the cost. In the second storing system, there was difficulty in realizing the relay processing with short delay time. The relay node must dealt with the relay of a plurality of data streams at the same time. Due to this, it is needed that a common resource of the node such as a memory be effectively used. However, the prior art did not comply with such a requirement.

BRIEF SUMMARY OF THE INVENTION

An object of the present invention is to provide a relay node system, which can reduce a delay time caused at a stream relay time, at a relatively low manufacturing cost, and which can temporarily store a large amount of data without occurring an overflow, and a control method of the same system.

According to the present invention, there is provided a relay node system, which receives a data stream having a series of data elements transmitted from a transmitting node and which re-outputs the data stream to a receiving node, comprising: data receiving means for receiving the data stream transmitted from the transmitting node; storing means for temporarily storing data of the received data stream; and data transmitting means for reading the data stored in the storing means to be transmitted to the receiving node, wherein the storing means includes primary buffer means, having a high-speed memory, for temporarily storing data of the data stream; secondary buffer means having a memory capacity slower and larger than the primary buffer means; and data transfer means for executing a save processing and a restore processing, the save processing detects danger of an overflow at an input side of the primary buffer means to transfer data from the primary buffer means to the secondary buffer means by a block unit, and the restore processing transfers data saved to the secondary buffer means to the primary buffer means by a block unit for the data transmission by the data transmitting means.

Also, according to the present invention, there is provided a relay control method in a relay node system, which receives a data stream having a series of data elements transmitted from a transmitting node and which re-outputs the data stream to a receiving node, comprising the steps of: receiving the data stream transmitted from the transmitting node; writing data of the data stream to primary buffer means; reading data written to the primary buffer means in accordance with an output rate to the receiving node requested to the corresponding data stream; executing a save processing for transferring the following data from the primary buffer means to secondary buffer means having a memory capacity slower and larger than the primary buffer means by a block unit when danger of an overflow occurs at an input side of the primary buffer means; and executing a restore processing for transferring data saved in the secondary buffer means by the save processing to the primary buffer means from the secondary buffer means such that the data can be continuously output to the receiving node following on storage data of the primary buffer means.

According to the above-mentioned structure, primary buffer means for temporarily storing the data stream to be relayed comprises a high-speed memory. As a result, a short-delay time relay processing can be realized. In addition, even if the capacity of primary buffer means is made small for the reason of the reduction of the manufacturing cost, the storage capacity of relay data can be enlarged for the following reason. Specifically, if there is possibility of danger that an overflow will occur at the input side of primary buffer means, data input to primary buffer means is transferred and saved into the secondary buffer means having a large capacity by a block unit though the transfer and save speed is low. Moreover, there is executed the restore processing for transferring data from secondary buffer means to primary buffer means by a block unit such that data saved in secondary buffer means can be continuously output to the receiving node following on non-saved data stored in primary buffer means. As a result, an underflow at the output side can be largely prevented.

Particularly, if the following steps are executed, data saved in secondary buffer means is restored to primary means, so that data saved therein can be continuously output to the receiving node following on data stored in Bj of primary buffer means.

Specifically, there is executed a step of setting a parameter including a block length bj, using as a unit of the save processing, and a primary buffer allocation size Bj as a size of an area necessary to temporarily store data of the stream in the primary buffer without saving every data stream to be relayed; and/or there is executed a step of setting the primary buffer allocation size Bj to a value more than data size of the corresponding data stream presumed to be transmitted from the primary buffer means by the data transmitting means during time period Tj, which is needed from time when a head portion of data of only the block length bj is arrived at the primary buffer means till the data reciprocates between the primary and secondary buffer means and all data is transmitted from the primary buffer means, in a case where an input rate Rinj of the corresponding data stream is larger than an output rate Routj.

By the above-mentioned parameter setting, the amount of data stored in primary buffer means is compared with an amount of data presumed during time period Tj of the corresponding data stream every data stream in which the save processing is not executed. Thereby, the stream, which may have danger of the overflow at the input side, can be easily detected. At this time, the mode of the corresponding stream can be switched from no save mode to the save mode, so that the overflow at the input side can be more effectively restrained.

Furthermore, if the following steps are executed, continuity of data transmission to the receiving node can be further ensured as using a low-speed secondary buffer means.

Specifically, there is executed a step of executing the save processing for transferring data of the block length bj to the secondary buffer means every time when data of the data stream having the save mode set is written to the primary buffer means by only the corresponding block length bj, and the restoring means starts the restore processing; there is executed a step of presuming time when the head portion of the data is transmitted by the data transmitting means to be set as a target restore complete time every time when data of the block length bj is transferred to the secondary buffer mans by the saving means; and there is executed a step of starting the restore processing for transferring the corresponding data from the second buffer means to the primary buffer means from time backing to the target restore complete time by time necessary to transfer the corresponding data from the secondary buffer means to the primary buffer means.

According to the present invention, the mode setting means switches the corresponding data stream from the save mode to the no save mode when a state that the following restoring data of the corresponding data stream is within a predetermined number is continued a predetermined number of times. Also, the mode switching step includes a substep of switching the corresponding data stream from the save mode to the no save mode when a state that the following restoring data of the corresponding data stream is within a predetermined number is continued a predetermined number of times.

Moreover, according to the present invention, the parameter setting means obtains a using rate $\rho 1$ of the primary buffer means based on the primary buffer allocation size Bj allocated to each data stream having the no save mode set, a size occupied on the primary buffer means by each data stream having the save mode set, and a size of the primary buffer means, the parameter setting means obtains an access channel using rate $\rho 2$ to the secondary buffer means based on a traffic of the save processing of data of the block length bj of each data stream having the save mode set and a traffic of the restore processing, and when at least one of the using rates $\rho 1$ and $\rho 2$ exceeds 1, the parameter setting means changes the block length bj of at least one of the data streams to recalculate the using rates $\rho 1$ and $\rho 2$. Also, the parameter setting step includes a substep of obtaining a using rate $\rho 1$ of the primary buffer means based on the primary buffer allocation size Bj allocated to each data stream having the no save mode set, a size occupied on the primary buffer means by each data stream having the save mode set, and a size of the primary buffer means, and obtaining an access channel using rate $\rho 2$ to the secondary buffer means based on a traffic of the save processing of data of the block length bj of each data stream having the save mode set and a traffic of the restore processing, and changing the block length bj of at least one of the data streams to recalculate the using rates $\rho 1$ and $\rho 2$ when at least one of the using rates $\rho 1$ and $\rho 2$ exceeds 1.

According to the above-explained structure, by decreasing or increasing the block length, occupying time of primary buffer means by the corresponding data stream can be shortened, and the number of times of occurring save and restore processings can be reduced.

Furthermore, a value, which is obtained by dividing the sum of a total sum $\Sigma 1$ and a total sum $\Sigma 2$ by a size L1 of the primary buffer, is set to $\rho 1$ wherein $\Sigma 1$ considers a first margin value $\alpha 1j$ ($0 \leq \alpha 1j < 1$) for buffering an input variation of the corresponding data stream of all data streams Bj to be relayed, and $\Sigma 2$ considers a second margin value $\alpha 2j$ ($0 \leq \alpha 2j < 1$) for buffering variations of save and restore processing time of the corresponding data stream having the size other than the primary buffer allocation size Bj occupied on the primary buffer means by each data stream having save mode set. Thereby, the corresponding variation can be buffered in accordance with the setting values of $\alpha 1j$ and $\alpha 2j$.

As mentioned above, according to the present invention, the temporarily storing buffer of the relay node is structured by combining primary buffer means having a high-speed memory with secondary buffer means with having a low-speed and large capacity. Then, suitable data transfer between primary and secondary buffer means and suitable data transmission from the primary buffer are controlled. As a result, the delay, which is caused at the stream relay time, can be reduced at a relatively low manufacturing cost, and the large amount of burst data can be temporarily stored without occurring the overflow.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a block diagram showing the structure of a relay node according to an embodiment of the present invention;

DETAILED DESCRIPTION OF THE INVENTION

The following will explain an embodiment of the present invention with reference to the accompanying drawings.
[Structure of relay node]

Figure 1:
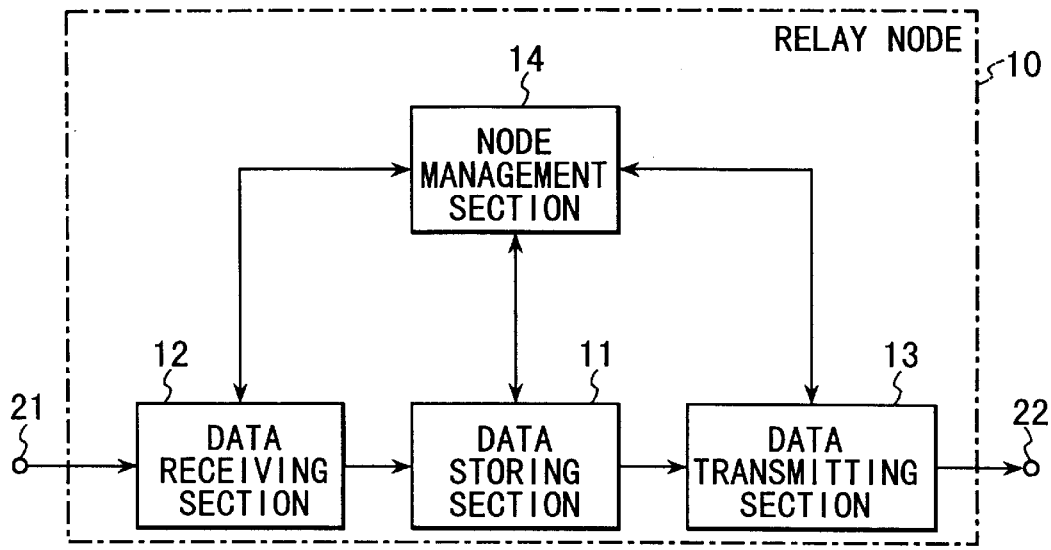
FIG. 1 is a block diagram showing the structure of a conventional relay node.

FIG. 2 is a block diagram showing the structure of the relay node (stream relay device) 10 of an embodiment of the present invention. In FIG. 2, the same reference numerals as the case of FIG. 1 are added to the portions common to FIG. 1. Then, the specific explanation is omitted.

FIG. 2 differs from FIG. 1 in the structure of the data storing section 11. The data storing section 11 comprises a primary buffer 111, a secondary buffer 112, and a data transfer section 113. The primary buffer 111 temporarily stores data of the packet received by the data receiving section 12. The secondary buffer 112 complements a storage area, which is in short supply in the primary buffer 111 to avoid the generation of an overflow of the primary buffer 111. The data transfer section 113 controls data transfer between the buffers 111 and 112 under the control of the node management section 14. The primary buffer 111 is a high-speed and small capacity buffer using a semiconductor memory such as RAM. The secondary buffer 112 is a low-speed and large capacity buffer using a large capacity storing medium such as a magnetic disk.

As mentioned above, a temporarily storing buffer having a data temporarily storing function of the data storing section 11 can be realized by a combination of the primary buffer 11 using the semiconductor memory and the secondary buffer 112 using the large capacity storage medium.

The data transfer section 113 of the data storing section 11 executes a scheduling of the data transfer between the buffers 111 and 112. The data transfer section 113 controls an optimum data transfer and an optimum retransmission of data by algorithm based on an amount of storing data in each of the buffers 111 and 112, a prediction value of input data stream, a data arrival event, and a data re-output event.
[Data transfer control between buffers 111 and 112]

The following will explain the outline of the data transfer control between the buffers 111 and 112 in the data storing section 111. An object of performing the data transfer between the primary buffer 111 and the secondary buffer 112 lies in the following two points:

One point is to avoid the generation of an overflow of the primary buffer 111 in inputting data to the primary buffer 111 in which a probability fluctuation occurs in the arrival period and the block length. The other point is to stably output data from the primary buffer 111 so as to re-output data to the next stage of the relay node (or receiving terminal). In this case, data transfer to the secondary buffer 112 from the primary buffer 111 is hereinafter called as "save." Also, data transfer to the primary buffer 111 from the secondary buffer 112 is hereinafter called as "restore."

In the structure of the data storing section 11 of this embodiment, finite processing time (fixed processing time) is needed in data save processing and data restore processing. If the secondary buffer 112 has one or a small number of the large capacity storage mediums, an access competition may be occurred between the save processing and the restore processing. If each of a plurality of streams uses the secondary buffer 112, the competition may be occurred between the streams. In order to prevent an overflow caused at the input side of the primary buffer 111 by wait time resulting from the competition and an underflow at the output side, it is necessary to perform an optimum scheduling in the data transfer section 113.

An efficiency of the scheduling can be controlled by the setting value of the block length to each stream. More specifically, it is assumed that the block length (save block length), which is a processing unit in saving and restoring, is set to b (e.g. byte as a unit). Specifically, if the value b is set to be small, occupying time of the primary buffer 111 is reduced, and this result contributes to the control of occurring the overflow of the primary buffer 111. On the other hand, since the number of times of save and restore increase, the entire processing time fixing section increases in accordance with save and restore processing. As a result, the access to the secondary buffer 112 relatively increases. This result brings about a main cause of increasing the generation of the buffer overflow due to wait delay. Therefore, the above point should be considered in the above-mentioned scheduling.

[Outline of steps of data transfer control]

Figure 3:
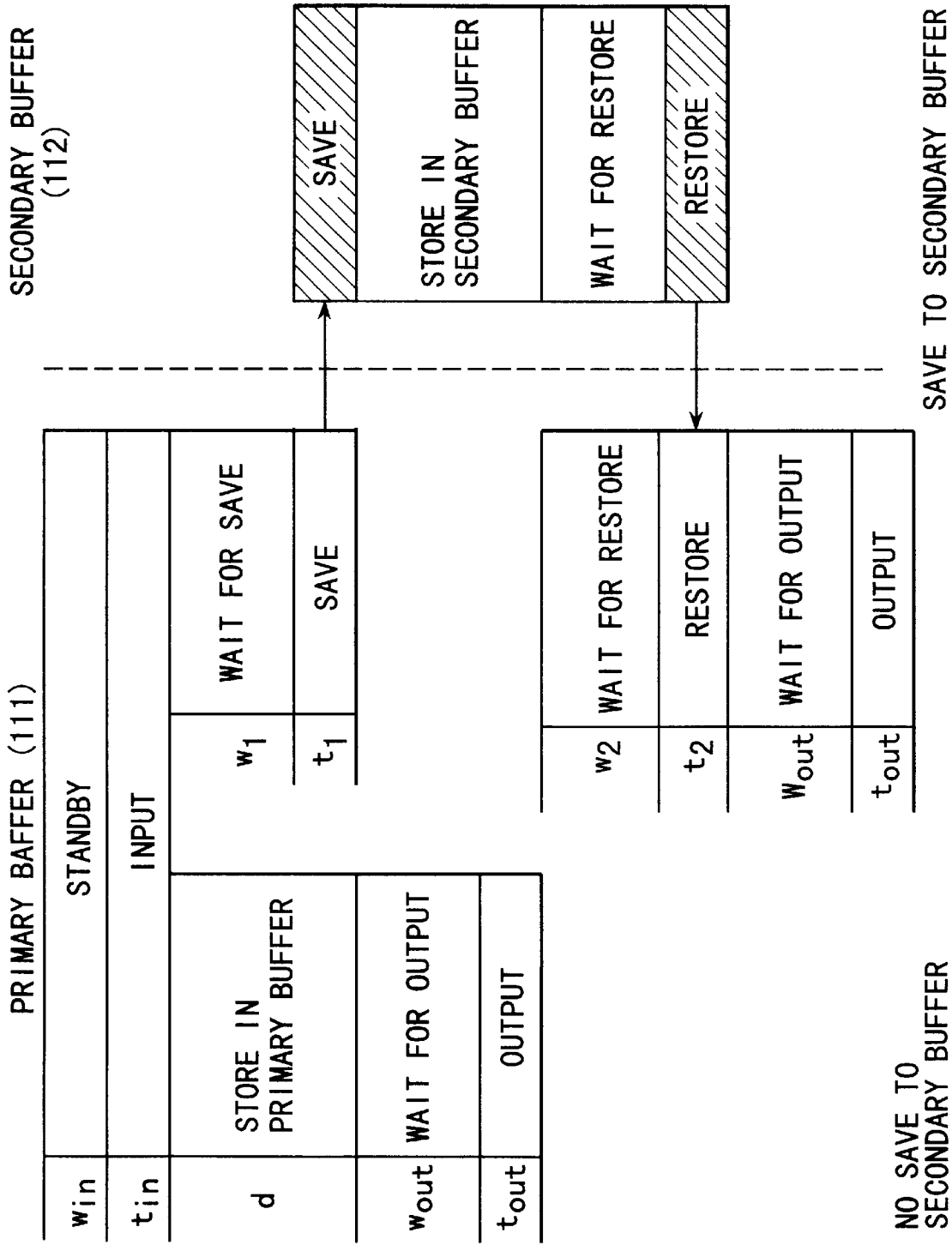
FIG. 3 is a timing chart for explaining the outline of steps of controlling data transfer between buffers 111 and 112 in the data storing section 11 of FIG. 2.

In the outline of the steps of controlling data transfer between the buffers 111 and 112 in the data storing section 11, the following will explain the save and restore processing of one stream of data with reference to a timing chart of FIG. 3.

In the data storing section 11, an input buffer area of a size Lin (e.g. byte as a unit) is ensured to receive input data to the primary buffer 111. Then, the data storing section 11 waits for an input of data in accordance with receiving the data packet from the transmission node on the network due to the data receiving section 12. In this case, Lin (input buffer area length) is a multiple of an integer of an access unit to the primary buffer 111. Then, Lin is set to be more than the value of the save block length b.

Generally, it is difficult to predict wait time Win of data input at a data stream start time. During data stream transfer, the scheduling is performed with reference to the last timing of one previous data block. Thereby, wait time Win can be minimized.

Next, data input to the input buffer area of the primary buffer 111 is started. Time (or mean time) tin (data input time), which is required to input data of only block length b, to the input buffer area, depends on an actual transfer data packet length. If an average input rate of the data streams is Rin, tin can be given by the following equation (unit is normally bit/sec, but in this case, the unit is set to byte/sec to adjust to the unit byte of the block length):

$$tin=b/Rin$$

At the time when input data of only block length b is completed, the data transfer section 113 discriminates whether data is left in the primary buffer 111 as it is or data is saved (transferred) to the secondary buffer 112. The decision ground will be described later. If data corresponding to Lin is input to the input buffer area of size Lin, a next buffer area of the size Lin is ensured in the primary buffer 111.

Then, data, which is discriminated to be left in the primary buffer 111 by the data transfer section 113, is stored on the primary buffer 111 as it is (storing time is set to d), and waits for re-output (for reading) by the data transiting section 13.

If the data transferring section 113 judges to save data to the secondary buffer 112, the data transferring section 113 saves all data to the secondary buffer 112 in a state that the block length b is used. In this case, data block transfer processing from the primary buffer 111 to the secondary buffer 112 is generated. Regarding data of all streams to be processed, the data block transfer to the secondary buffer 112 is performed to all streams to be simultaneously processed. Due to this, in a case where the competition occurs, wait time (wait time for save) W1 is generated. Therefore, if time (save processing time), which is required to actually transfer the data block to be written from the primary buffer 111 to the secondary buffer 112, is set to t1, time (save time), which is required to saving, becomes W1+t1.

The data transfer section 113 must execute a restore processing such that the data block saved to the secondary buffer 112 is restored to the primary buffer 111 to meet timing of the re-output of the block. Due to this, an output buffer area of size Lout (e.g., byte as a unit) is ensured on the primary buffer 111. In this case, Lout (output buffer area length) is a multiple of an integer of an access unit to the primary buffer 111. Then, Lout is set to be more than the value of the save block length b.

Similar to the restore processing, wait time (wait time for restore) W2 is generated. Therefore, if time (restore processing time), which is required to actually read out the data block to be transferred from the secondary buffer 112 to the primary buffer 111, is set to t2, time (restore time), which is required to saving, becomes W2+t2.

Save processing time t1 and t2 of the data block depend on the characteristic of a storing device forming the secondary buffer 112. For example, in a device utilizing a rotatable recording medium such as a magnetic disk, an optical disk, the time is needed to execute the save processing of the data block in view of seek time for transferring the head at a data writing time, wait time for rotation (no dependent on the block length), and time for actually transferring and writing data (dependent on the block length). The same point can be explained in the restore processing of the data block. In other words, the save and restore time becomes a sum of a portion, which does not depend on the block length b, and a portion, which depends on the block length b.

The simplest approximate equations of presumption values of save processing time t1 and restore time t2 can be expressed as follows:

$$t1=f1+b/r1$$

$$t2=f2+b/r2$$

wherein f1: time (save processing time fixing portion), which does not depend on the block length b at the save processing time, r1: a write speed to the secondary buffer 112, f2: time (restore processing time fixing portion), which does not depend on the block length b at the restore processing time, and r2: a reading speed from the secondary buffer 112.

Since time t1 and t2 are presumption values, they are hereinafter called as presumption save processing time and presumption restore processing time, respectively.

The data block restored to the primary buffer 111 from the secondary buffer 112 waits for re-outputting. After wait time (wait time for transmission) Wout, the data block is re-output to the receiving node of the next stage (specifically, relay node or a receiving terminal) by the data transmitting section 13. If an average output rate of the data streams is Rout (unit is normally bit/sec, but in this case, the unit is set to byte/sec to adjust to the unit byte of the block length), time (data transmitting time) tout, which is required to the re-output, can be expressed as follows:

$$tout=b/Rout.$$

In the case of relaying a video stream of a fixed bit rate, timing of the re-output of restore data can be presumed in advance by the node management section 14. As a result, the node management section 14 starts the restore processing of the data transfer section 113 to adjust to presumed timing of retransmission. Thereby, wait time Wout for transmission can be minimized.

According to the above-explained embodiment of the present invention, an operation efficiency of a data temporarily storing mechanism is limited by an access through-put to the capacity of the primary buffer 111 and the secondary buffer 112. This will be described later.

[Relay control]

The following will explain the relay control including the above-explained data transfer control of the relay node 10 of FIG. 2.

Figure 4:
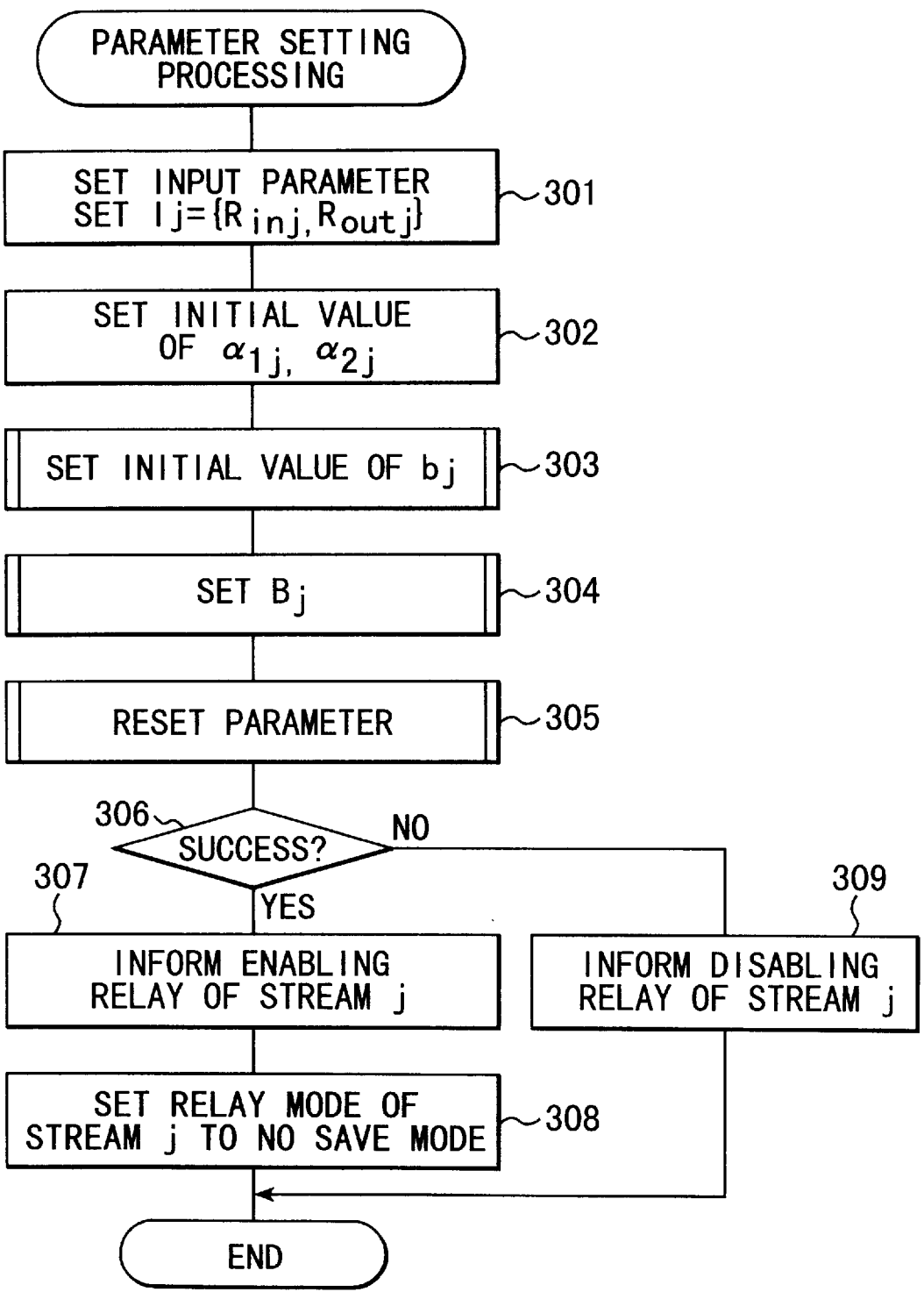
FIG. 4 is a flow chart for explaining a parameter setting processing according to the embodiment of the present invention.

First, at the time of requesting transfer of data stream j to the relay node 10 of FIG. 2 from the transmission node of the previous stage (video server, relay node, etc.), a data input rate Rinj is informed (notified) to the node management section 14. The node management section 14 stores data input rate Rinj informed from the transmission node therein. Thereafter, in corporation with the data transfer section 113, the management section 14 executes a parameter setting processing, which is used to set a parameter group necessary for the relay control of data stream j, in accordance with a flow chart of FIG. 4.

First, the node management section 14 provides an input parameter set Ij={Rinj, Routj}, which is a traffic characteristic value (presumption value) to the data transfer section 113 (step 301). It is assumed that a system parameter set={f1, f2, r1, r2} is given to the data transfer section 113 in advance by the node management section 14.

The data transfer section 113 sets an initial value (fixed value) of each of margin values $\alpha 1j$ and $\alpha 2j$ (step 302). In this case, the margin value $\alpha 1j$ is used to buffer a variation in inputting data stream j, and the margin value $\alpha 2j$ is used to buffer a variation in saving and restoring data stream j.

Next, the data transfer section 113 sets an initial value (fixed value) of a block length bj, which is a processing unit in saving data of the data stream j (step 303).

Figure 5:
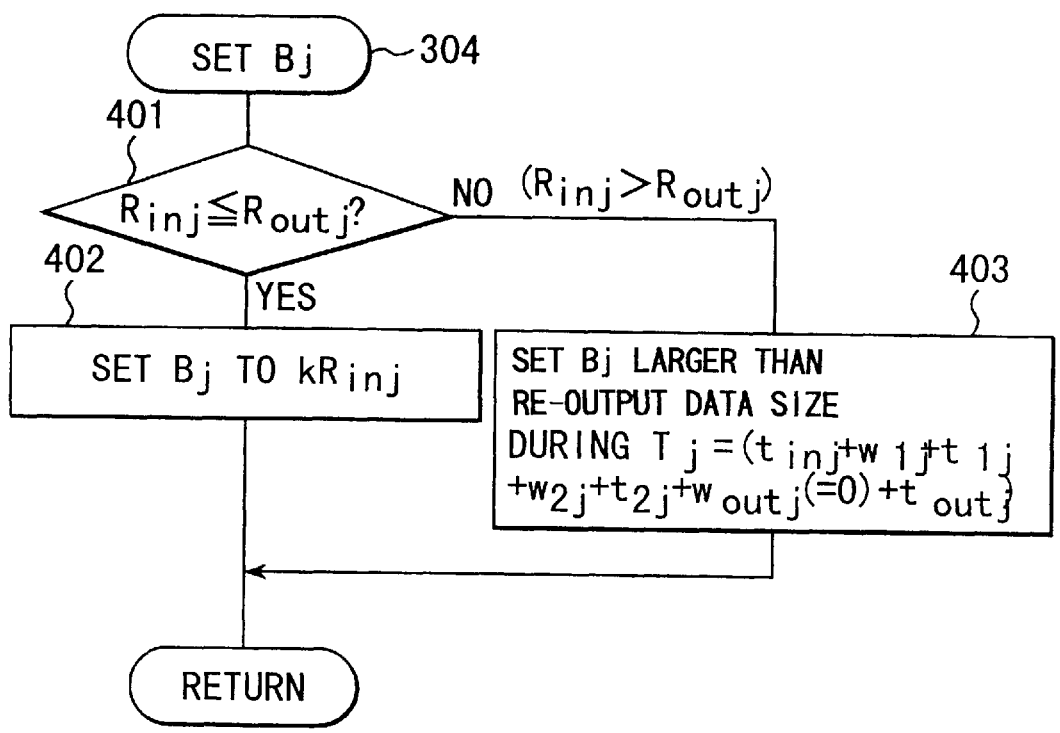
FIG. 5 is a flow chart for explaining a Bj setting processing according to the embodiment of the present invention.

Next, the data transfer section 113 executes a Bj setting processing in accordance with a flow chart of FIG. 5 (step 304). In this case, the Bj setting processing sets a size Bj (allocated to the primary buffer) of an area for storing data of the data stream j in the primary buffer 111 (without being saved to the secondary buffer 112) based on, for example, the input parameter set Ij={Rinj, Routj}.

First, the data transfer section 113 discriminates the level of Rinj and Routj (step 401). If Rinj≦Routj, data held in the primary buffer 111 is data by the arrival data during wait time Wout for transmission (re-output) and the variation of input data. From this reason, the value Bj is set to e.g., a value (k·Rinj), which is proportional to Rinj (step 402). In this case, as k (proportional coefficient), a value with which Bj can buffer an input variation may be used.

On the other hand, if Rinj>Routj, the value of Bj is set to be larger than a value of the data size, Routj×Tj of the stream to be re-output during Tj=(tinj+w1j+t1j+w2j+t2j+Woutj (=0)+toutj) (step 403). In this case, Tj is a sum of input time tini of data of only size b to be input to the primary buffer 111, time (w1j+t1j+w2j+t2j+woutj (=0)), which is needed to reciprocate (save and restore) data of only size b between the primary buffer 111 and the secondary buffer 112, and output time toutj of data of only size b to be output to the secondary buffer 111. Moreover, the value more than Routj×Tj is a value in which a predetermined fixed value is added to the data size Routj×Tj to be re-output during time Tj.

Thus, time Tj shows presumption time, which is needed from time when the head portion of data of only size (block length) b reaches the primary buffer 111 till all data is transmitted from the primary buffer 111. In this case, time Tj includes time when data is reciprocated between the primary buffer 111 and the secondary buffer 112. Therefore, it is assumed that a value of a primary buffer allocation size Bj, which is allocated to the data stream j, is set to more than the data size (Routj×Tj) of the stream j to be re-output during time Tj. In a case where there is a danger that the area of Bj will overflow and following data of the stream j is temporarily saved in the secondary buffer 112 to avoid such a danger, save data can be restored to the primary buffer 111 to be continuously re-output, following on storing data of the area of Bj. In other words, continuity of re-output can be ensured.

Similar to the cases of tin, tout, data input time tinj and data output time toutj can be obtained by bj/Rinj and bj/Routj, respectively. In other words, they are the presumption time, which is needed when data of only size bj reaches, and the presumption time, which is needed when data of only size bj is re-output, respectively.

Moreover, similar to the cases of t1, and t2, presumption save processing time t1j and presumption restore processing time t2j can be obtained by f1+bj/r1 and f2+bj/r2, respectively.

Also, each of wait time for save w1j and wait time for restore w2j can be presumed as a single processing model in which an access from all data streams j using the same secondary buffer 112 is used as an input. For example, the request of the save and that of the restore are dealt as the same priority. Then, by performing approximation of a multi-dimension M/M/1 type in which the generation of the request from the stream j is at random and time for processing one block is set in accordance with an exponential distribution (that is, by inducing an approximation equation from a queuing theory), average wait time can be approximately expressed as follows:

$$W1j = W2j = \Sigma [(t1j)2 \times (Rinj/bj)/\{1 - t1j \times (Rinj/bj)\} + (t2j)2 \times (Routj/bj)/\{1 - t2j \times (Routj/bj)\}].$$

In this case, t1j and t2j depend on bj as already explained. Therefore, w1j and w2j depend on bj, Rinj, and Routj. Also, since W1j and W2j are presumption values, they are hereinafter called as presumption wait time for save and presumption wait time for restore, respectively in the following explanation.

Thus, in the case of Rinj<Routj, the value Bj depends on bj and Rinj, and Routj.

If the Bj setting processing is completed, the data transfer section 113 performs a reset processing (parameter reset processing) such as a block length b, margin values $\alpha 1j$ and $\alpha 2j$ (step 305). The parameter reset processing will be specifically described later.

In a case where the data transfer section 113 succeeds in the parameter reset processing of step 305 (step 306), the data transfer section 113 informs to the node management section 14 of the point that the relay of the data stream j requested from the transmission node can be executed. Also, the data transfer section 113 sets the relay mode of the data stream j to no save mode, which is an initial mode (steps 307 and 308). In a case where the data transfer section 113 fails in the parameter reset processing, the data transfer section 113 informs the node management section 14 of the point that the relay of the data stream j requested from the transmission node cannot be executed (step 309). In a case where each data stream has a priority, it is possible to abandon the relay of the stream including the stream which is being relayed, whose the priority is the lowest.

The node management section 14 receives the information from the data transfer section 113, and informs the transmission node of whether the requested data stream j can be relayed or not.

Figure 6:
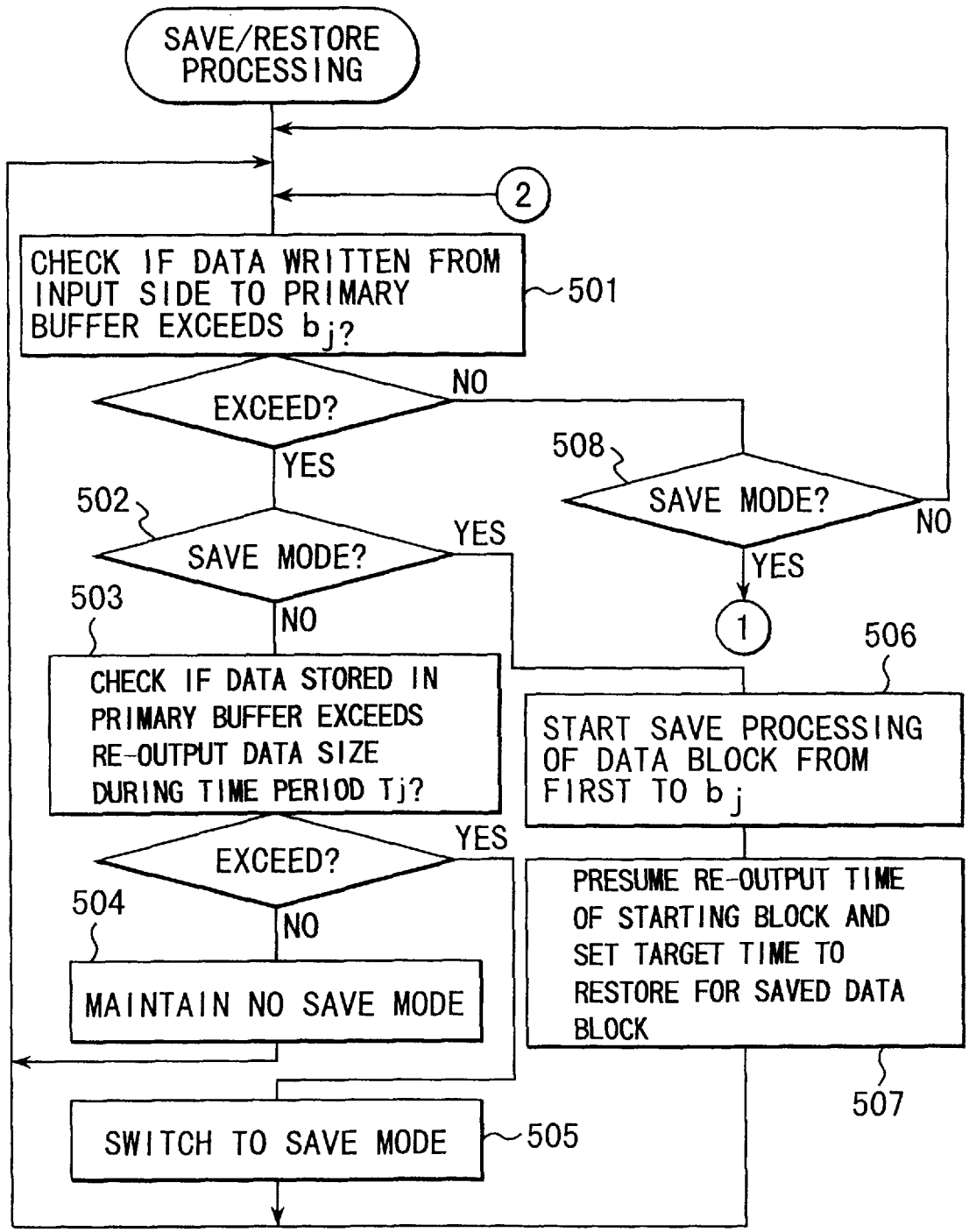
FIG. 6 is a view showing a part of a flow chart for mainly explaining save/restore processing due to a data transfer section 113 in a relay operation according to the embodiment of the present invention.
Figure 7:
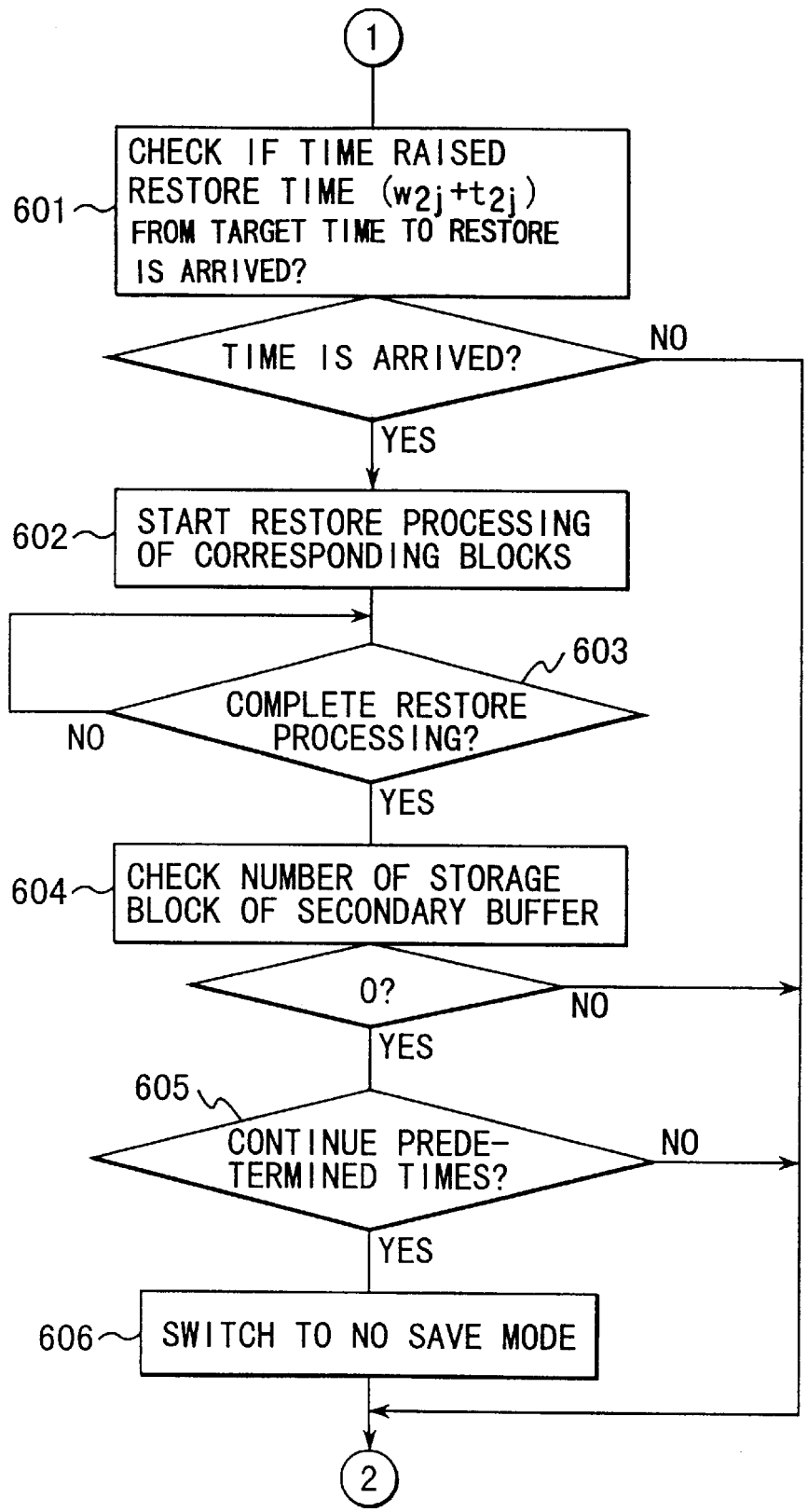
FIG. 7 is a view showing the other parts of the flow chart for mainly explaining save/restore processing due to the data transfer section 113 according to the embodiment of the present invention.

Next, the following will explain an operation in the case of relaying the data stream j, mainly save and restore processings by the data transfer section 113, with reference to flow charts of FIGS. 6 and 7.

The data receiving section 12 waits for the arrival of data (data packet) of the data stream j sent from the transmission node on the network. After the output rate Routj is set by instruction from the node management section 14, the data transmitting section 13 waits until data of the data stream j is written in the primary buffer 111.

If the data packet arrives, the data receiving section 12 starts a writing (data inputting) operation such that data of the packet is written to the primary buffer 111 of the data storing section 11. On the other hand, the data transmitting section 13 detects the data writing to the primary buffer 111, and starts the re-output processing (data transmission processing) from the head.

If data of the data stream j written to the primary buffer 111 by the data receiving section 12 exceeds the set block length bj of the stream j (step 501), the data transfer section 113 of the data storing section 11 checks whether or not the data size of the stream j stored in the primary buffer 11 exceeds the data size to be re-output during Tj (step 503). In this case, Tj is a sum of data input time tinj, time (w1j+t1j+w2j+t2j+woutj (=0)), and data output time toutj from the primary buffer 111. Data input time tinj is presumption time, which is needed when data of only bj arrives. Time (w1j+t1j+w2j+t2j+woutj (=0)) is time, which is needed to reciprocate (save and restore) data between the primary buffer 111 and the secondary buffer 112. Data output time toutj is presumption time, which is needed to transmit data of only bj.

If the amount of storing data of the stream j in the primary buffer 111 does not exceed the data size to be re-output during time period Tj, the data transfer section 113 judges that there is no danger that the primary buffer 111 will overflow. As a result, no save mode is maintained (step 504). If the amount of storing data of the steam j exceeds the data size to be re-output, the data transfer section 113 changes the relay mode of the stream j to a save mode from no save mode to prevent the occurrence of the overflow of the primary buffer 111 (step 505).

If data of the data stream j written into the primary buffer 111 exceeds the block length bj (step 501) and the save mode is set (step 502), the data transfer section 113 starts save processing of data, which is from starting data block to bj, from the primary buffer 111 to the secondary buffer 112. In this case, if the save processing just after the change from no save mode to the save mode is started, the data transmitting section 13 continues re-outputs non-saved data among data of the stream j stored in the primary buffer 111. At the time of starting the save processing, data exceeding bj is used as data written to the primary buffer 111.

Next, the data transfer section 113 presumes starting block re-outputting time of the data block saved to the secondary buffer 112 based on the output rate Routj of the corresponding data stream j, and sets the starting block re-outputting time as target restore complete time (step 507).

On the other hand, if data of the data stream j written to the primary buffer 111 does not exceed the block length bj (step 501) and no save mode is set (step 508), the processing returns to step 501.

If data of the data stream j written to the primary buffer 111 does not exceed the block length bj (step 501) and the save mode is set (step 508), the data transfer section 113 performs the following processing:

First, the data transfer section 113 checks if time raised restore time (w2j+t2j) from the target restore complete time is arrived (step 601). If time is arrived, the data transfer section 113 starts the restore processing to restore the corresponding blocks to the primary buffer 111 from the secondary buffer 112 (step 602).

Then, if the restore of the corresponding blocks to the primary buffer 111 is completed (step 603), the data transfer section 113 checks the number of storage blocks of the secondary buffer 112 (step 604).

If the number of storage blocks is 0, that is, the saved data blocks are immediately restored (immediate restore), the data transfer section 113 checks if the discrimination of the number of storage blocks=0 (immediate restore) continues predetermined times (step 605). If the decision of the number of storage blocks=0 (immediate restore) continues predetermined times, the data transfer section 113 determines that a burst input variation of the stream j is stopped, a margin is formed in the area of size Bj allocated to the stream j, and that there is no danger of overflow. Then, the data transfer section 113 switches the relay mode of the stream j to no save mode from the save mode (step 606). Thereafter, the operation of the data transfer section 113 goes back to step 501.

If time raised restore time (w2j+t2j) from the target restore complete time is not arrived (step 601), the number of storing blocks is 0 (step 604), or the number of storage blocks=0 (immediate restore) does not continue predetermined times (step 605), the processing return step 501.

Figure 8:
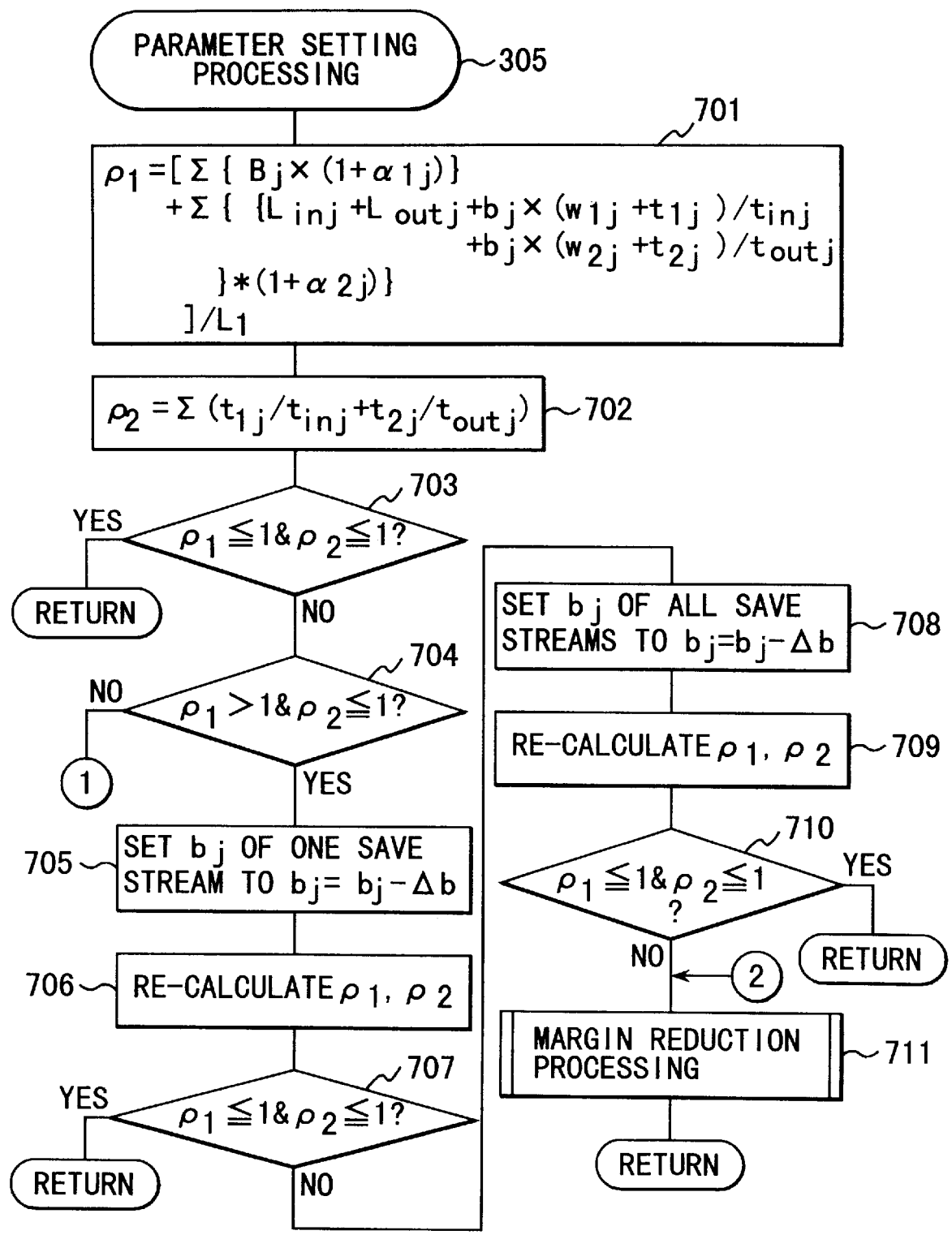
FIG. 8 is a view showing a part of a flow chart for explaining a parameter reset processing according to the embodiment of the present invention.
Figure 9:
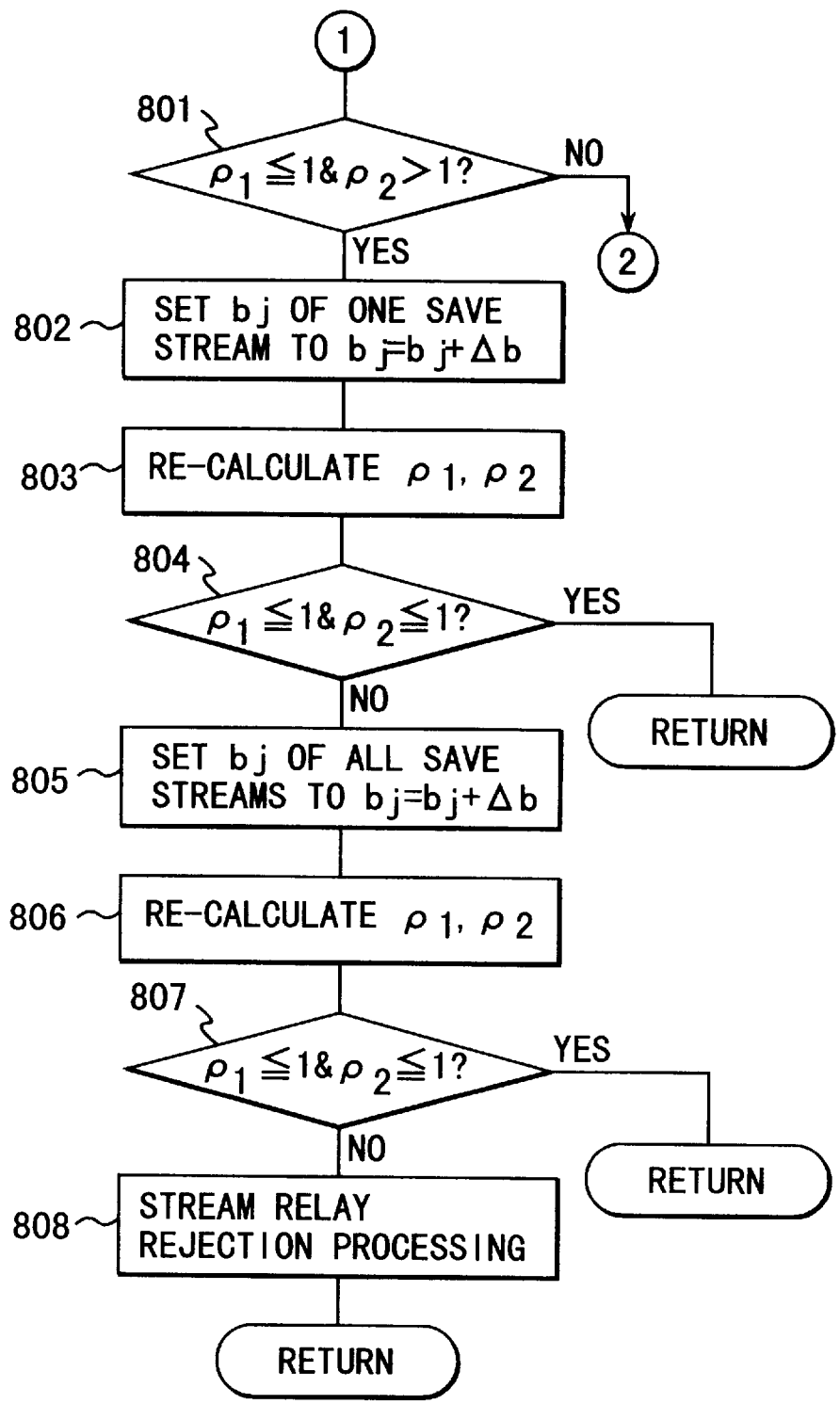
FIG. 9 is a view showing the other parts of the flow chart for explaining a parameter reset processing according to the embodiment of the present invention.

The following will specifically explain the parameter reset processing (step 305) with reference to the flowcharts of FIGS. 8 and 9.

The data transfer section 113 performs the following reset processing (update processing) of the parameters such as block length b, margin values $\alpha 1j$, $\alpha 2j$, etc., when a new stream is added, the relay process of the stream is completed, or a considerable inconsistency of prediction is detected. In this case, the considerable inconsistency of prediction is a case in which it is detected from the measured value that the input variation to the input rate Rin of the data stream j informed from the transmitting node exceeds a predetermined allowable range (wherein, the measurement of the input rate Rinj of the stream j is performed by the data receiving section 12 during the corresponding data stream j). In this case, the sudden end of the transfer of the data stream j is included in the detection of the inconsistency of prediction.

In the parameter reset processing, the data transfer section 113 obtains primary and secondary buffer access channel using rates $\rho 1$ and $\rho 2$ based on the latest traffic characteristic values Rinj and Routj of each stream j (steps 701 and 702).

The primary buffer access channel using rates $\rho 1$ can be obtained by dividing the addition of a total sum $\Sigma 1$ and a total sum $\Sigma 2$ by the size (primary buffer size) L1 of the primary buffer 111, and this can be expressed as follows:

$$\rho 1 = (\Sigma 1 + \Sigma 2)/L1$$

wherein, $\Sigma 1 = \Sigma\{Bj \times (1+\alpha 1j)\}$.

In this case, $\Sigma 1$ is the total sum of the sizes Bj (primary buffer allocation sizes) of the areas of the buffer 111 allocated to the respective no save streams j (streams j in no save mode). In the total sum $\Sigma 1$, margin value $\alpha 1j$ is considered. In other words, the total sum $\Sigma 1$ is the entire size of the primary buffer 111 which all no save streams occupy. Moreover, $\Sigma 2$ is the total sum which can be obtained as follows:

Specifically, of each save stream j, the input buffer area length Linj of the primary buffer 111 and the output buffer area length Loutj are added. Then, the save buffer length bj of the primary buffer 111 and the restore buffer length (save block length) bj are multiplied by the presumption using time rate. The obtained result is added to the addition (Linj+Loutj). As a result, the total amount $\Sigma 2$ can be obtained. In the total sum Σ2, margin value α2j is considered. In other words, the total sum Σ2 is the entire size of the primary buffer 111 which all save streams occupy.

Regarding the save buffer length (=save block length) bj, the presumption using time rate is a time (restore time) rate, which is needed to save data (data block) of the size b to the secondary buffer 112 from the primary buffer 111, against time, which is needed when data of the stream j arrives by only size b. In other words, this can be shown by (w1j+t1j)/tinj. Regarding the restore buffer length (=save block length) bj, the presumption using time rate is a time (restore time) rate, which is needed to restore data (data block) of the size b to the primary buffer 111 from the secondary buffer 112, against time, which is needed when data of the stream j arrives by only size b. In other words, this can be shown by (w2j+t2j)/tout.

Therefore, Σ2 can be expressed as follows:

$$\Sigma 2 = \Sigma[\{Linj + Loutj$$
$$+ bj \times (w1j + t1j)/tinj$$
$$+ bj \times (w2j \times t2j)/toutj\} \times (1 + \alpha 2j)]$$

The secondary buffer access channel using rates ρ2 is a sum of save data traffic t1j/tinj of the save stream j and restore data traffic t2j/toutj. This can be shown by $$\rho 2 = \Sigma(t1j/tinj + t2j/toutj).$$

The values of ρ1 and ρ2 are changed by the primary buffer allocation size Bj and the block length bj which are given to each stream j.

The data transfer section 113 calculates the values of ρ1 and ρ2, and compares the calculated values of ρ1 and ρ2 with a capacity limit of 1 to check whether these values are less than 1 (step 703). If they are less than 1, the data transfer section 113 judges that the values Bj and bj, which are currently given to the respective streams j, are appropriate, and completes the parameter reset processing.

If ρ2 is less than 1 and ρ1 exceeds 1 (step 704), the data transfer section 113 selects one stream j. Then, the data transfer section 113 recalculates the values of ρ1 and ρ2 by the same way as steps 701 and 702 in a case where the block length (save block length) bj allocated to the steam j is reduced by a predetermined fixed value Δ b (steps 705, 706). In this case, the stream may be arbitrarily selected as an object of the operation of bj=bj–Δb. However, if this processing is started by the addition of a new stream, or the detection of the considerable inconsistency of prediction, a steam, which is a main factor of such an addition or an inconsistency of prediction, may be selected.

If the values of ρ1 and ρ2 recalculated in steps 706 are less than 1 (step 707), the data transfer section 113 uses each bj for the corresponding stream j, and completes the parameter reset processing. If at least one of the values of ρ1 and ρ2 exceeds 1, regarding all save streams j, the data transfer section 113 recalculates values of ρ1 and ρ2 in a case where the block length (save block length) bj is reduced by Δ b (steps 708, 709).

If the values of ρ1 and ρ2 recalculated in steps 709 are less than 1 (step 710), the data transfer section 113 uses each bj for the corresponding stream j, and completes the parameter reset processing. If at least one of the values of ρ1 and ρ2 exceeds 1 even in a case when the recalculation is performed, the processing returns to a margin reduction processing (step 711) described later.

Regarding one stream j, it is assumed that the block length (save block length) bj is reduced by Δ b in step 708, ρ1 and ρ2 are recalculated in steps 709, and that at least one of the re-calculated values of ρ1 and ρ2 still exceeds 1. In this case, the following operation may be performed. Specifically, the stream j in which bj is reduced by Δ b is switched, and the recalculation of ρ1 and ρ2 and its evaluation are repeated in a range, which does not exceed a predetermined number of times until both values of ρ1 and ρ2 become less than 1 or the stream j disappears.

On the other hand, if ρ1 is less than 1 and ρ2 exceeds 1 (steps 703, 704, 801), the data transfer section 113 selects one stream j. Then, the data transfer section 113 recalculates values of ρ1 and ρ2 obtained when the block length (save block length) bj allocated to the stream j is increased by Δ b (steps 802, 803).

If both values of ρ1 and ρ2 recalculated in step 803 are less than 1 (step 804), the data transfer section 113 uses bj for the corresponding scream j, and completes the parameter reset processing. If one of the values of ρ1 and ρ2 exceeds 1, the data transfer section 113 recalculates values of ρ1 and ρ2 obtained when the block lengths (save block lengths) bj of all save streams j are increased by Δ b (steps 805, 806).

In this case, if both values of ρ1 and ρ2 recalculated in step 806 are less than 1 (step 807), the data transfer section 113 uses each bj for the corresponding scream j, and completes the parameter reset processing. If one of the values of ρ1 and ρ2 exceeds 1 even after the recalculation of step 807, the data transfer section 113 returns to a stream relay rejection processing (808) described later.

If both values of ρ1 and ρ2 calculated in steps 701 and 702 exceed 1 (steps 703, 704, 801), the data transfer section 113 returns to a margin reduction processing of step 711.

Figure 10:
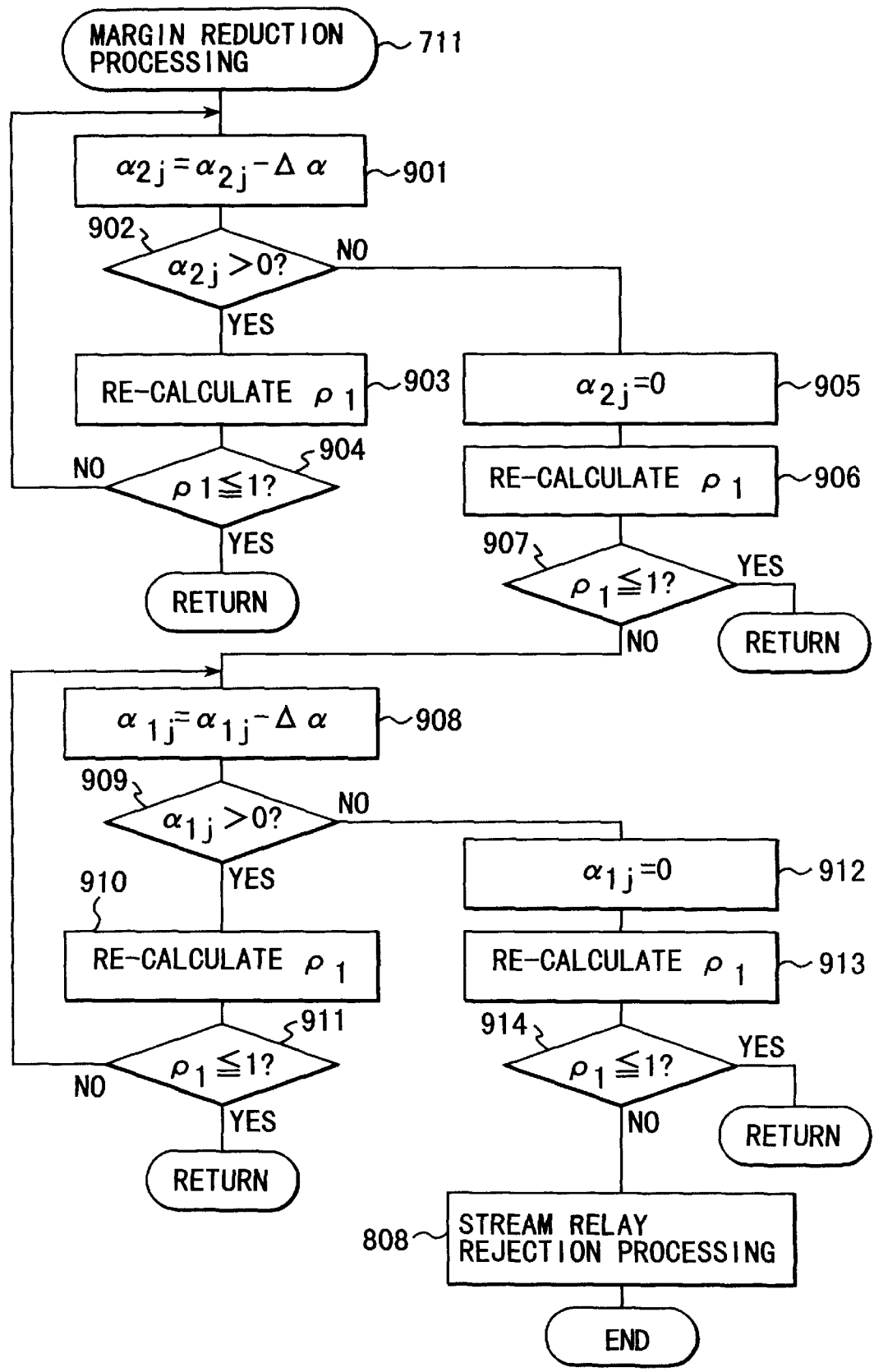
FIG. 10 is a flow chart explaining a margin reducing processing of step 711 of FIG. 8.

Next, the following will explain the margin processing of step 711 with reference to the flow chart of FIG. 10.

First, in a range where margin values α2j (normally, positive decimal value less than 1) allocated to buffer the variation of save and restore time of each stream is positive, the data transfer section 113 reduces the corresponding value of α2j by a predetermined fixed value Δα (steps 901, 902). Thereafter, the data transfer section 113 recalculates the value of ρ1 (step 903).

If the value of ρ1 recalculated in step 902 is less than 1 (step 904), the data transfer section 113 uses each α2j for the corresponding stream j, and completes the parameter reset processing.

If the value of ρ1 re-calculated in step 902 still exceeds 1, the data transfer section 113 executes the following processings after step 901 again. Then, even if each α2j is set to 0 (step 905) to recalculate ρ1 (step 906), the value of ρ1 does not become less than 1 (step 907). In this case, the data transfer section 113 executes the following processing. Specifically, in a range where margin values α1j (normally, positive decimal value less than 1) allocated to buffer the variation of the input of each stream j is positive, the data transfer section 113 reduces the corresponding value of α1j by Δα (steps 908, 909). Thereafter, the data transfer section 113 re-calculates the value of ρ1 like as step 701 (step 910).

If the value of ρ1 re-calculated in step 910 is less than 1 (step 911), the data transfer section 113 uses each of α1j and α2j for the corresponding steam j, and completes the parameter reset processing.

If the value of α1j re-calculated in step 910 still exceeds 1, the data transfer section 113 executes the following processings after step 908 again. Then, even if each α1j is set to 0 (step 912) to recalculate ρ1 (step 913), the value of ρ1 does not become less than 1 (step 914). In this case, the data transfer section 113 executes the stream relay rejection processing of step 808 of FIG. 9.

Figure 11:
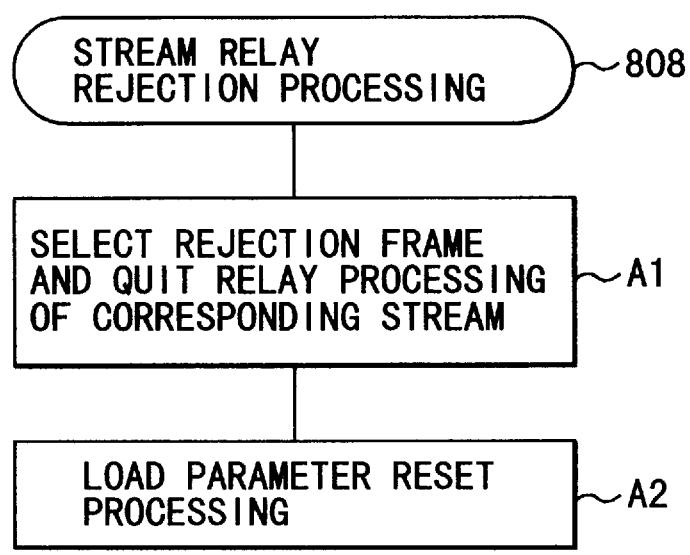
FIG. 11 is a flow chart explaining a frame abandon processing of step 808 of FIG. 9.

Next, the following will explain the stream relay rejection processing of step 808 with reference to the flow chart of FIG. 11.

First, the data transfer section 113 selects a stream to be rejected its relay. Then, the data transfer section 113 rejects the relay processing of the selected stream (step A1). In step A1, when a new stream is added (the relay of the stream is newly requested), the new stream may be selected. Or, the stream having the lowest priority may be selected from the streams, which are being relayed. In the cases other than the case of adding the new stream, the stream having the lowest priority may be selected from the streams, which are being relayed.

Next, the data transfer section 113 calls the parameter reset processing shown by the flow charts of FIGS. 8 and 9 to calculate ρ1 and ρ2 of the residual streams 1. As a result, the parameters such as block length bj, etc., is loaded (step A2), so that the replay processing is maintained (in the case that no frame relay rejection processing is need again).

In the explanation of the above embodiment, when the amount of storing data of the stream j in the primary buffer 111 exceeded the data size to be re-output during time period Tj, no save mode was immediately switched to the save mode. However, for example, if the space area (non-allocated area), which is more than the difference in the size data, exists on the primary buffer 111, Bj is increased by only the difference or the value in which the fixed amount is added to the difference, and no save mode is maintained. If data is still in short supply, no save mode may be switched to the save mode.

The processing functions of the respective sections of the relay node of FIG. 2, that is, the data receiving section 12, the data transmitting section 13, the node management section 14, and the data transfer section 113 can be realized as follows. Specifically, the recording medium (memory card, floppy disk, CD-ROM, etc.) in which a program for realizing the above processing functions by the data processor such as a computer having a CPU is used. Then, the recording medium is mounted on the data processor to read the program recorded in the recording medium.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

We claim:

1. A relay node system, which receives a data stream having a series of data elements transmitted from a transmitting node and which re-outputs the data stream to a receiving node, comprising:

data receiving means for receiving said data stream transmitted from said transmitting node;

storing means for temporarily storing data of said received data stream; and data transmitting means for reading said data stored in said storing means to be transmitted to said receiving node, wherein said storing means includes:
   primary buffer means, having a high-speed memory, for temporarily storing data of said data stream;
   secondary buffer means having a memory capacity slower and larger than said primary buffer means; and
   data transfer means for executing a save processing and a restore processing, said save processing including processing for detecting danger of an overflow at an input side of said primary buffer means to transfer data from said primary buffer means to said secondary buffer means by a block unit, and said restore processing including processing transferring data saved to said secondary buffer means to said primary buffer means by a block unit for the data transmission by said data transmitting means.

2. The system according to claim 1, wherein said data transfer section comprises parameter setting means for setting a parameter including a block length bj, using as a unit of said save processing, and a primary buffer allocation size Bj as a size of an area necessary to temporarily store data of the stream in said primary buffer without saving every data stream to be relayed.

3. The system according to claim 2, wherein said parameter setting means further sets said primary buffer allocation size Bj to a value more than the data size of the corresponding data stream presumed to be transmitted from said primary buffer means by said data transmitting means during time period Tj, which is needed from time when a head portion of data of only said block length bj is arrived at said primary buffer means till said data reciprocates between said primary and secondary buffer means and all data is transmitted from said primary buffer means, in a case where an input rate Rinj of said corresponding data stream is larger than an output rate Routj.

4. The system according to claim 2, wherein said data transfer means comprises mode setting means, said mode setting means checks an amount of storing data of the stream in said primary buffer means every data stream with no save processing, and when said amount of storing data of the corresponding data stream exceeds the amount of data presumed to be transmitted during said time period Tj, said mode setting means detects danger of the overflow at the input side, and switches no save mode with said save processing to a save mode with said save processing.

5. The system according to claim 4, wherein said data transfer means comprises:

saving means for executing said save processing, in which said save processing transfers data of the block length bj to said secondary buffer means every time when data of said data stream having said save mode set is written to said primary buffer means by only the corresponding block length bj, and restoring means for starting said restore processing, in which said restore processing presumes time when the head portion of said data is transmitted by said data transmitting means to be set as a target restore complete time every time when data of said block length bj is transferred to said secondary buffer means by said saving means, and starting said restore processing for transferring the corresponding data from said second buffer means to said primary buffer means from time backing to the target restore complete time by time necessary to transfer said corresponding data from said secondary buffer means to said primary buffer means.

6. The system according to claim 4, wherein said mode setting means switches the corresponding data stream from said save mode to said no save mode when a state that the following restoring data of the corresponding data stream is within a predetermined number is continued a predetermined number of times.

7. The system according to claim 2, wherein said parameter setting means obtains a using rate ρ1 of said primary buffer means based on said primary buffer allocation size Bj allocated to each data stream having said no save mode set, a size occupied on said primary buffer means by each data stream having said save mode set, and a size of said primary buffer means, said parameter setting means obtains an access channel using rate ρ2 to said secondary buffer means based on a traffic of the save processing of data of said block length bj of each data stream having said save mode set and a traffic of the restore processing, and when at least one of said using rates ρ1 and ρ2 exceeds 1, said parameter setting means changes said block length bj of at least one of said data streams to recalculate said using rates ρ1 and ρ2.

8. The system according to claim 7, wherein said parameter setting means reduces said block length bj of at least one of said data streams when said using rate ρ1 exceeds 1, and increases said block length bj of at least one of said data streams when said using rate ρ2 exceeds 1.

9. The system according to claim 2, wherein said parameter setting means calculates said using rate ρ1 from a total sum Σ1 and a total sum Σ2, and the size L1 of said primary buffer 111 by the following equation:

$$\rho1=(\Sigma1+\Sigma2)/L1$$

wherein Σ1 considers a first margin value α1j (0<α1j<1) for buffering an input variation of the corresponding data stream of said primary buffer allocation size Bj allocated to each data stream having no save mode set, and Σ2 considers a second margin value α2j (0<α2j<1) for buffering variations of save and restore processing time of the corresponding data stream of the size occupied on said primary buffer means by each data stream having save mode set, and said parameter setting means obtains an access channel using rate ρ2 to said secondary buffer means based on a traffic of the save processing of data of said block length bj of each data stream having said save mode set and a traffic of the restore processing, and when at least one of said using rates ρ1 and ρ2 exceeds 1, said block length bj of at least one of said data streams is changed to recalculate said using rates ρ1 and ρ2.

10. The system according to claim 9, wherein said parameter setting means reduces said block length bj of at least one of said data streams when said using rate ρ1 exceeds 1, increases said block length bj of at least one of said data streams when said using rate ρ2 exceeds 1, and reduces at least one of said first and second margin values α1j and α2j so as to recalculate said using rates ρ1 and ρ2.

11. A relay control method in a relay node system, which receives a data stream having a series of data elements transmitted from a transmitting node and which re-outputs said data stream to a receiving node, comprising the steps of:

receiving said data stream transmitted from said transmitting node;

writing data of said data stream to primary buffer means;

reading data written to said primary buffer means in accordance with an output rate to said receiving node requested to the corresponding data stream;

executing a save processing for transferring the following data from said primary buffer means to secondary buffer means having a memory capacity slower and larger than said primary buffer means by a block unit when danger of an overflow occurs at an input side of said primary buffer means; and executing a restore processing for transferring data saved in said secondary buffer means by said save processing to said primary buffer means from said secondary buffer means such that said data can be continuously output to said receiving node following on storage data of said primary buffer means.

12. The method according to claim 11, wherein said save processing includes the substep of setting a parameter including a block length bj, using as a unit of said save processing, and a primary buffer allocation size Bj as a size of an area necessary to temporarily store data of the stream in said primary buffer without saving every data stream to be relayed.

13. The method according to claim 12, wherein said save processing includes the substep of setting said primary buffer allocation size Bj to a value more than an amount of data of the corresponding data stream presumed to be transmitted from said primary buffer means by said data transmitting means during time period Tj, which is needed from time when a head portion of data of only said block length bj is arrived at said primary buffer means till said data reciprocates between said primary and secondary buffer means and all data is transmitted from said primary buffer means, in a case where an input rate Rinj of said corresponding data stream is larger than an output rate Routj.

14. The method according to claim 12, wherein said save processing includes the steps of:

checking an amount of storing data of the stream in said primary buffer means every data stream with no save processing;

detecting danger of the overflow at the input side when said amount of storing data of the corresponding data stream exceeds the amount of data presumed to be transmitted during said time period Tj; and switching no save mode with said save processing to a save mode with said save processing.

15. The method according to claim 14, wherein said save processing includes the steps of:

executing said save processing for transferring data of the block length bj to said secondary buffer means every time when data of said data stream having said save mode set is written to said primary buffer means by only the corresponding block length bj, and said restoring means starts said restore processing;

presuming time when the head portion of said data is transmitted by said data transmitting means to be set as a target restore complete time every time when data of said block length bj is transferred to said secondary buffer mans by said saving means; and starting said restore processing for transferring said corresponding data from said second buffer means to said primary buffer means from time backing to the target restore complete time by time necessary to transfer said corresponding data from said secondary buffer means to said primary buffer means.

16. The method according to claim 15, wherein said mode switching step includes a substep of switching the corresponding data stream from said save mode to said no save mode when a state that the following restoring data of the corresponding data stream is within a predetermined number is continued a predetermined number of times.

17. The method according to claim 16, wherein said parameter setting step includes a substep of obtaining a using rate ρ1 of said primary buffer means based on said primary buffer allocation size Bj allocated to each data stream having said no save mode set, a size occupied on said primary buffer means by each data stream having said save mode set, and a size of said primary buffer means, and obtaining an access channel using rate ρ2 to said secondary buffer means based on a traffic of the save processing of data of said block length bj of each data stream having said save mode set and a traffic of the restore processing, and changing said block length bj of at least one of said data streams to recalculate said using rates ρ1 and ρ2 when at least one of said using rates ρ1 and ρ2 exceeds 1.

18. The method according to claim 17, wherein said parameter setting step includes a substep of reducing said block length bj of at least one of said data streams when said using rate ρ1 exceeds 1, and increasing said block length bj of at least one of said data streams when said using rate ρ2 exceeds 1.

19. The method according to claim 16, wherein said parameter setting step includes a substep of calculating said using rate ρ1 from a total sum Σ1 and a total sum Σ2, and the size L1 of said primary buffer by the following equation:

$$\rho 1 = (\Sigma 1 + \Sigma 2)/L1$$

wherein Σ1 considers a first margin value α1j (0≦α1j<1) for buffering an input variation of the corresponding data stream of said primary buffer allocation size Bj allocated to each data stream having no save mode set, and Σ2 considers a second margin value α2j (0<α2j<1) for buffering variations of save and restore processing time of the corresponding data stream of the size occupied on said primary buffer means by each data stream having save mode set, and obtaining an access channel using rate ρ2 to said secondary buffer means based on a traffic of the save processing of data of said block length bj of each data stream having said save mode set and a traffic of the restore processing, and changing said block length bj of at least one of said data streams to recalculate said using rates ρ1 and ρ2 when at least one of said using rates ρ1 and ρ2 exceeds 1.

20. The method according to claim 19, wherein said parameter setting step reducing said block length bj of at least one of said data streams when said using rate ρ1 exceeds 1, and increasing said block length bj of at least one of said data streams when said using rate ρ2 exceeds 1.

* * * * *

UNITED STATES PATENT AND TRADEMARK OFFICE
CERTIFICATE OF CORRECTION

PATENT NO. : 5,809,078
DATED : September 15, 1998
INVENTOR(S) : H. Tani et al.

It is certified that error appears in the above-indentified patent and that said Letters Patent is hereby corrected as shown below:

COLUMN      LINE

17      22      "$(0<\alpha 1j<1)$" should read --$(0 \leq \alpha 1j < 1)$--
(Claim 9, line 6)

17      26      "$(0<\alpha 2j<1)$" should read --$(0 \leq \alpha 2j < 1)$--
(Claim 9, line 10)

19      18      "$(0<\alpha 2j<1)$" should read --$(0 \leq \alpha 2j < 1)$--
(Claim 19, line 10)

Signed and Sealed this

Eleventh Day of May, 1999

Attest:

Q. TODD DICKINSON

*Attesting Officer*      *Acting Commissioner of Patents and Trademarks*